United States Patent [19]

Stauffer

[11] 4,230,941
[45] Oct. 28, 1980

[54] CORRECTOR LENS

[75] Inventor: Norman L. Stauffer, Englewood, Colo.

[73] Assignee: Honeywell Inc., Minneapolis, Minn.

[21] Appl. No.: 23,865

[22] Filed: Mar. 26, 1979

[51] Int. Cl.³ .............................................. G01J 1/36
[52] U.S. Cl. .................................. 250/204; 350/167
[58] Field of Search ............... 250/201, 204, 216, 578; 354/25; 350/167; 356/141, 152

[56] References Cited

U.S. PATENT DOCUMENTS

| 3,940,788 | 2/1976 | Abe et al. | 350/167 |
| 4,132,888 | 1/1979 | Kondo | 250/204 |
| 4,185,191 | 1/1980 | Stauffer | 354/25 |

Primary Examiner—David C. Nelms
Attorney, Agent, or Firm—Charles J. Ungemach

[57] ABSTRACT

A corrector lens for use in a distance determining system employing a plurality of detector elements arranged in pairs and mounted proximate a plurality of lenslets. Each lenslet creates an image of the exit pupil of the objective lens of the system and when the objective lens is properly positioned, each of the detectors of each pair receives approximately the same amount of radiation. The corrector lens operates to direct radiation from the objective lens to the lenslets so that each lenslet receives radiation generally along its optic axis rather than at an angle thereto so that the radiation detectors may be mounted approximately equal distant on opposite sides of the axis and thus receive radiation from the lenslets along substantially equal paths.

13 Claims, 4 Drawing Figures

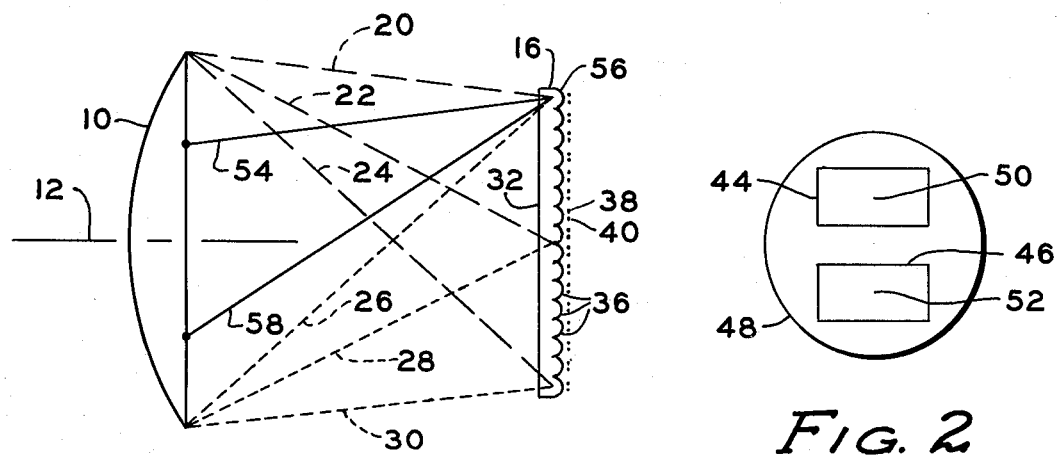
FIG. 1
FIG. 2
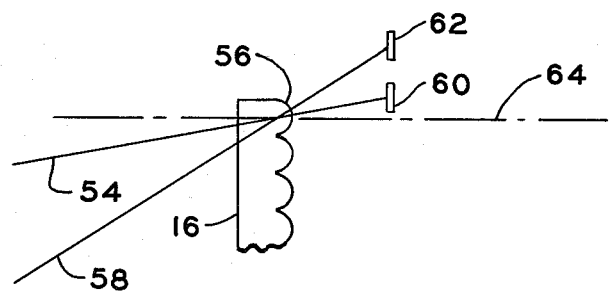
FIG. 3
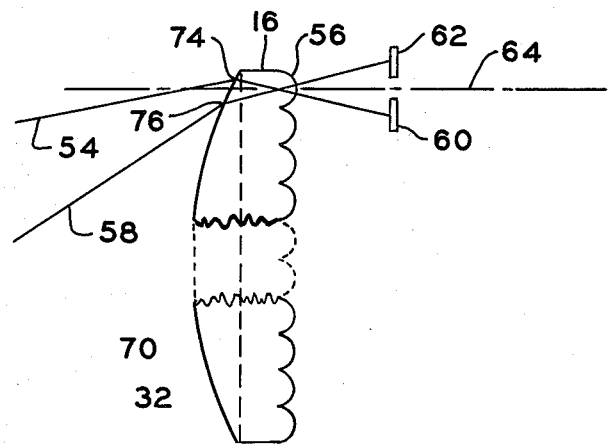
FIG. 4

CORRECTOR LENS

BACKGROUND OF THE INVENTION

The present invention relates generally to a lenslet array and more particularly to a lenslet arrangement such as is found in my copending application Ser. No. 912,688, filed June 5, 1978 now U.S. Pat. No. 4,185,191 and in the copending application of Stauffer and Wilwerding, Ser. No. 16,595, filed Mar. 1, 1979 wherein the lenslets are used in connection with distance determining or automatic focusing of, for example, photographic or television cameras.

In the above-mentioned copending applications, radiation from a remote scene to be focused upon is directed by an objective lens to a plurality of lenslets mounted proximate the image plane of the objective lens. Each lenslet produces an image of the exit pupil of the objective lens and proximate the image plane of each lenslet is mounted a pair of radiation sensitive detectors. Each detector produces an output indicative of the radiation it receives and when the objective lens is properly positioned in the desired focus position, the detectors in each pair will receive approximately the same amount of radiation. As the objective lens moves from a proper focus position, the output of the detectors becomes unequal. The inequality in the outputs of the detectors is analyzed by a system to determine the direction the objective lens must be moved to attain a proper focus.

Lenslets which are positioned near the center of the lenslet array generally receive radiation from the objective lens approximately equally about the optic axis of such lenslets so that the radiation they transmit to the detectors emerges generally along their optic axes. It has been found, however, that lenslets near the edge of the lenslet array receive radiation from the objective lens at an angle to the optic axis of such lenslets so that the radiation transmitted by such lenslet travels along a path which exposes one of the detectors in the pair to a greater share of the radiation than the other of the detectors of that pair even when the objective lens is in the proper focus position and thus the output of the two detectors may not be equal which could falsely indicate an out-of-focus condition.

SUMMARY OF THE INVENTION

The present invention overcomes the problem found in the prior art by introducing a corrector lens between the objective lens and the lenslet array so as to direct the radiation from the objective lens to the individual lenslets more nearly parallel to and symmetric about the optic axis of each lenslet and thus provide an image from each lenslet which emerges generally symmetrically about its optic axis. The two detectors may now be mounted substantially equal distant from the optic axis of each lenslet and thus receive substantially the same amount of radiation when the objective lens is in the proper focus position.

BRIEF DESCRIPTION OF THE DRAWINGS

FIG. 1 shows the objective lens and lenslet array of the above-mentioned copending applications;

FIG. 2 shows how a pair of detectors may be positioned within the image of the exit pupil of the objective lens;

FIG. 3 shows radiation directed to a pair of detectors from a lenslet near the end of the array in the above-mentioned copending applications; and FIG. 4 shows the radiation directed to a pair of detectors from a lenslet near the end of the array when the corrector lens of the present invention is utilized.

DETAILED DESCRIPTION OF THE PREFERRED EMBODIMENTS

In FIG. 1, a lens 10, representing the objective lens of an optical system or the taking lens of a camera, is shown having an axis 12 along which lens 10 is moveable in the directions shown by arrows 14. Lens 10 receives radiation from a scene being viewed at the left in FIG. 1 and directs the radiation towards the right to a lenslet array 16 mounted proximate the image plane of lens 10. Radiation from the upper portion of lens 10 is shown being directed to the lenslet array 16 along paths such as is shown by the long-dashed lines 20, 22 and 24 and radiation from the lower portion of lens 10 is shown directed to the lenslet array 16 along paths such as is shown by the short-dashed lines 26, 28 and 30. Lenslet array 16 is shown having a flat surface 32 and a second surface composed of a plurality of lenslets such as identified by reference numeral 36. Behind each lenslet is shown a pair of dots such as identified by reference numerals 38 and 40 representing a pair of radiation sensitive detectors. Each lenslet produces an image of the exit pupil of objective 10 so that the detectors such as 38 and 40 will receive equal amounts of radiation when lens 10 is in the proper focus position.

FIG. 2 shows one such pair of detectors, identified by reference numerals 44 and 46, within an image of the exit pupil of lens 10 identified as a circle 48. It is seen that detectors 44 and 46 are of the same size and positioned substantially equidistant from the center of the exit pupil 48. When the detectors are near the center of the array 16, this arrangement will cause detector 44 to receive substantially the same amount of radiation as detector 46 at a proper focus position for lens 10. In the center of detector 44 is shown a point 50 representing the point where a ray of radiation from the center of that part of the lower portion of objective lens 10 being viewed by detector 44 strikes while in the center of detector 46 is shown a point 52 representing the point where a ray of radiation from the center of that part of the upper portion of the objective lens 10 being viewed by detector 46 strikes.

Referring again to FIG. 1, a ray of radiation, identified by reference numeral 54, is shown leaving the upper portion of lens 10 and arriving at the center of an upper lenslet 56 in the lenslet array 16. Also in FIG. 1, a radiation ray, identified by reference numeral 58, is shown leaving the lower portion of objective lens 10 and arriving at the center of the upper lenslet 56. These two rays will pass through lenslet 56 and strike the detectors associated therewith substantially at the center as, for example, at points 50 and 52 in FIG. 2. Rays 54 and 58 will be used in connection with the descriptions of FIGS. 3 and 4.

FIG. 3 shows an enlarged view of the upper portion of the lenslet array 16 of FIG. 1 with radiation ray 54 passing through lenslet 56 to be focused on a detector 60 while the radiation ray 58 is shown passing through lenslet 56 to be focused on a radiation detector 62. The optic axis of lenslet 56 is shown as a dash-dot line 64. For purposes of clarity, detectors 60 and 62 are shown spaced in an exaggeratedly remote position with respect to lenslet 56 and in actual practice they will be much closer.

Rays 54 and 58 strike the centers of detectors 60 and 62 in a manner similar to the rays striking the center 50 and the center 52 of detectors 44 and 46 of FIG. 2. It is seen in FIG. 3 that the rays 54 and 58 arrive at the lenslets 56 substantially below the optic axis 64 and are focused on the detectors 60 and 62 at a position substantially above the optic axis 64. As a result of this, the energy received by detector 62 has travelled a longer path from lenslet 56 than the energy arriving at detector 60. Furthermore, because of the greater angle between ray 58 and axis 64 than the angle between ray 54 and axis 64, the distribution of energy over the surface of detector 62 is less dense than that over the surface of detector 60. As a result, the output signal from detector 62 will be somewhat less than the output from detector 60 even when a proper focus condition exists. The difference in output signals from detectors 60 and 62 may produce a false indication to the sensing system that an out-of-focus condition exists and is thus generally undesirable.

FIG. 4 shows an enlarged view of the lenslet array 16 and the upper lenslet 56 with its optic axis 64 as well as the same two radiation rays 54 and 58 and the same two detectors 60 and 62 as were shown in FIG. 3. In FIG. 4, however, an additional lens 70 is shown mounted proximate to or on the rear surface 32 of the lenslet array 16 for purposes of bending the radiation rays 54 and 58 so that they travel generally along the axis 64 when they arrive at lenslet 56 and emerge therefrom rather than at the angles shown in FIG. 3. The corrector lens 70 may be a separate lens mounted adjacent the surface 32 of the lenslet array 16 or may be molded as the back of the lenslet array 16. Lens 70 may be spherical for ease in production but may be of other shapes, for example cylindrical, so as to to direct the rays such as 54 and 58 in a more symmetrical manner about with axis 64. As seen in FIG. 4, ray 54 now strikes the surface of lens 70 at a point 74 where it is bent towards axis 64 at a slight angle thereto. Ray 58 now strikes lens 70 at a point 76 where it is bent towards axis 64 at a slight angle approximately equal to the angle of ray 74. As a result, the rays emerging from lenslet 56 now emerge at substantially equal angles and strike detectors 60 and 62 after having travelled substantially equal distances from lenslet and at substantially equal angles to axis 64. Detectors 60 and 62 are now shown mounted substantially equally spaced from axis 64 on opposite sides thereof and thus the density of radiation received by detectors 60 and 62 will be substantially equal when a proper focus condition exists.

Rays arriving at the other lenslets in the array 16 will also be bent more towards their optic axes and thus each of the pairs of detectors behind each of the lenslets may be equally spaced about the optic axis of such lenslet and receive equal amounts of radiation when a proper focus position exists in a manner similar to that shown for lenslet 56 of FIG. 4.

In cases where it is desired that detectors 60 and 62 respond only to visible radiation, such as in photographic applications, then lens 70 may also be made as a filter for minimizing long wavelength or infrared radiation. In other cases, the filter may be made to minimize certain other undesirable wavelengths.

It is thus seen that I have provided a corrector lens for use with a lenslet array in a focus detecting system so that at a proper focus condition, the detectors upon which each lenslet focuses an image of the exit pupil of the objective lens receive substantially equal amounts of radiation. Many changes and alterations to the arrangements shown and described in connection with the preferred embodiment will occur to those skilled in the art. For example, as mentioned above, the corrector lens 70, while shown to be formed as the back surface of the lenslet array, may be a separately mounted lens with respect to the lenslet array and while a spherical corrector lens has been shown, other lens shapes may be used. Accordingly, I do not wish to be limited by the showings used in connection with the description of the preferred embodiments, but intend only to be limited by the appended claims.

The embodiments of the invention in which an exclusive property or right is claimed are defined as follows:

1. In an optical system employing a plurality of lenslets each having an optic axis and arranged on a first surface of a transparent member which member has a second surface on the opposite side from the first surface and wherein radiation passes through the first and second surfaces and is focused by the lenslets to form a plurality of images for detection by a plurality of radiation sensitive detectors mounted proximate the member and arranged in pairs with each pair receiving radiation from a different one of the lenslets, the improvement comprising:

a lens proximate the second surface so that radiation from each of the lenslets is directed substantially equally about the optic axis thereof.

2. Apparatus according to claim 1 wherein the lens is formed on the second surface.

3. Apparatus according to claim 1 wherein said lens comprises a filter.

4. Apparatus according to claim 1 wherein said lens is spherical.

5. Apparatus of the class described comprising, in combination:

a moveable objective lens for focusing radiation from a remote object and when properly positioned to provide an image of the object at a first image plane;

a plurality of lenslets each having an optic axis and mounted proximate the first image plane;

a corrector lens mounted between said objective lens and said plurality of lenslets so that radiation from said objective lens is directed by said corrector lens to the lenslets and each lenslet directs radiation generally symmetrically about its optic axis to provide an image of the exit pupil of said objective lens at a second image plane; and a plurality of radiation responsive detectors mounted proximate the second image plane and arranged in pairs so that the detectors of each pair are mounted substantially equidistant on opposite sides of the optic axis of each lenslet and receive substantially equal radiation when said objective lens is properly positioned.

6. Apparatus according to claim 5 wherein said plurality of lenslets are formed on a first surface of a transparent member having a second surface.

7. Apparatus according to claim 6 wherein said corrector lens is formed on the second surface.

8. Apparatus according to claim 5 wherein said corrector lens is spherical.

9. Apparatus according to claim 8 wherein said corrector lens comprises a filter.

10. Apparatus of the class described comprising, in combination:

- a transparent member having first and second surfaces, the first of the surfaces being formed as a lens and the second of the surfaces being formed as a plurality of lenslets each having an optic axis, radiation passing through the first surface being directed by the lens toward each lenslet generally along the optic axis thereof and each lenslet directing radiation generally along its optic axis to form an image at a first image plane; and
- a plurality of radiation responsive detectors mounted proximate said transparent member at the first image plane and arranged in pairs with each pair receiving radiation from a different one of the lenslets and the detectors in each pair being substantially equidistant from the optic axis of the lenslet with which it is associated.

11. Apparatus according to claim 10 further including an objective lens having a second image plane with said transparent member being mounted so that the plurality of lenslets lies proximate the second image plane and the image formed by each lenslet comprises the exit pupil of said objective lens.

12. Apparatus according to claim 11 wherein said transparent member comprises a filter.

13. Apparatus according to claim 10 wherein said lens formed in the first of the surfaces is spherical.

* * * * *